United States Patent Office 3,297,713
Patented Jan. 10, 1967

3,297,713
DITHIOBIS(N-PHENYLMALEIMIDES)
Elbert C. Ladd, Passaic, N.J., assignor to United States Rubber Company, New York, N.Y., a corporation of New Jersey
No Drawing. Filed Mar. 30, 1962, Ser. No. 183,754
3 Claims. (Cl. 260—326.3)

This invention relates to a new class of chemicals, denoted as symmetrical dithiobis(N-phenylmaleimides) and to the method of preparing same. In addition, the invention relates to the use of these novel compounds as vulcanizing agents for rubber.

The subject compounds may be represented by the following formula:

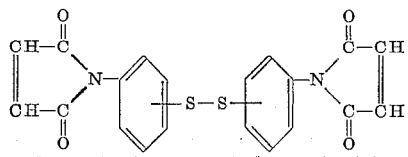

The two sulfur atoms can be attached to the respective aromatic rings at any position, with respect to the maleimido groups to give a symmetrical structure.

The subject compounds are prepared in a two step process by (1) reacting a symmetrical dithiodianiline with maleic anhydride to give a dithiobis(N-phenylmaleamic acid), and then (2) converting this intermediate compound to the corresponding dithiobis(N-phenylmaleimide) with acetic anhydride and sodium acetate. Using the preparation of 2,2'-dithiobis(N-phenylmaleimide) as an example, the reactions may be illustrated as follows:

STEP 1

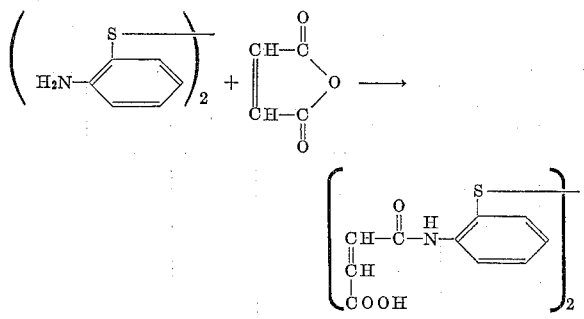

STEP 2

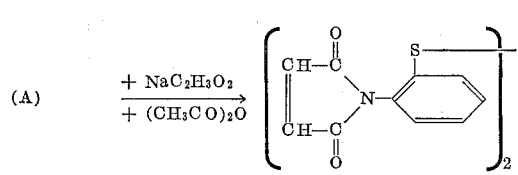

The compounds of this invention may be used as vulcanizing agents for natural and synthetic rubbers having high olefinic unsaturation. Furthermore, rubber stocks cured by the subject compounds exhibit improved resistance to wear and cut-growth when compared with similar stocks cured by known bismaleimide-type compounds. The rubber is compounded in the conventional way with from 0.25 to 6.0 parts by weight, and preferably from 1.5 to 2.5 parts by weight, of the subject compounds per 100 parts of rubber, together with other conventional compounding agents, typically carbon black and an oily plasticizer, after which the stock is shaped and vulcanized in the manner well-known for the vulcanization of rubber. The subject compounds may be used as the sole vulcanizing agent or cojointly with other vulcanizing agents or accelerating agents.

The rubbers which are operable in this invention are the natural and the synthetic rubbers which have high olefinic unsaturation and which are conventionally vulcanized with sulfur. Such synthetic rubbers are the homopolymers of aliphatic conjugated diolefin hydrocarbons and copolymers of such diolefins with monoolefins compounds copolymerizable therewith. Such monoolefins include styrene; alpha-methylstyrene; p-methylstyrene; alpha, p-dimethylstyrene; acrylic and methacrylic nitriles, amides, acids and esters; vinyl pyridines; fumaric esters; methylenemalonic esters; vinylidene chloride; methyl vinyl ketone; and methyl isopropenyl ketone. Mixtures of such monoolefinic compounds can also be copolymerized with the diolefin. The term "high olefinic unsaturation" here connotes an amount of unsaturation on the order of that occurring in Hevea rubber. The copolymers must contain copolymerized therein at least about 35% of the diolefin hydrocarbon. The butyl rubbers, which are elastomers made by an ionic polymerization process, from a major amount of an isoolefin and a minor amount of a conjugated diolefin hydrocarbon in an organic solvent, are not curable with maleimides, and are excluded from the scope of the invention.

The synthetic rubbers referred to may be either emulsion polymers or stereospecific (or stereoregular) homopolymers and copolymers of aliphatic conjugated diolefin hydrocarbons, of which the polymers of greatest commercial interest now are cis-1,4-polyisoprene (often called synthetic natural rubber) and cis-1,4-polybutadiene.

The following examples illustrate the invention:

EXAMPLE I

Step 1.—Preparation of a bismaleamic acid

To 248 grams of 2,2'-dithiodianiline in 1000 ml. of dioxane at 25° C. was added 196 grams of maleic anhydride in 500 ml. of dioxane. A mild exothermic reaction was observed which yielded 437 grams of product having a greenish-yellow color. The product has a melting point of 205°–208° C. and is identified as 2,2'-dithiobis(N-phenylmaleamic acid).

Analysis for $C_{20}H_{16}N_2S_2O_6$: Calculated, 6.3% N; Found, 6.27% N.

Step 2.—Conversion of the bismaleamic acid to a bismaleimide

In a 500 ml. flask, a mixture of 88 grams of the above bismaleamic acid, 200 grams of acetic anhydrde and 4 grams of sodium acetate was heated to 90°–95° C. for 20 minutes. The reaction mixture was poured into water resulting in a green colored product which had a melting range of 145°–152° C. After several recrystallizations from benzene, a nearly white product was obtained which had a melting point of 171°–173° C. and was identified as 2,2′-dithiobis(N-phenylmaleimide).

Analysis for $C_{20}H_{12}N_2S_2O_4$:

|  | Calculated | Found |
|---|---|---|
| Percent N | 6.86 | 6.82 |
| Percent S | 15.68 | 15.10 |

The 4,4′-dithiobis(N-phenylmaleimide) may be prepared by the same procedure as above from 4,4′-dithiodianiline, a method for making which is to be found in Organic Synthesis Collective, vol. III, page 86, published by J. Wiley & Sons.

EXAMPLE II

This example demonstrates the use of 2,2′-dithiobis-(N-phenylmaleimide) as a vulcanizing agent. A commercial styrene-butadiene copolymer rubber (SBR) with a styrene content of about 20 percent (SBR-1500) was compounded with 50 parts, per hundred of rubber, of a high abrasion furnace black (marketed under the registered trademark, Philblack O, by the Phillips Chemical Co.), 7.5 parts of a naphthenic type oil, and 1.9 parts of 2,2′-dithiobis(N-phenylmaleimide). By way of comparison, a similar sample was prepared by replacing the 2,2′-dithiobis(N - phenylmaleimide) with N,N′-m-phenylenebismaleimide, a known vulcanizing agent. Compounding was done in the conventional manner. The rubber, black and oil were assembled and mixed in a Banbury mixer for 10 minutes. Discharge temperatures was 275°–300° F. The vulcanizing agent was added on a cool two-roll mill. Samples were cured in a press at several temperatures and times as indicated below, and tested by the conventional testing methods used for rubber.

|  | Parts by Weight | |
|---|---|---|
| Stock | 1 | 2 |
| SBR-1500 | 100 | 100 |
| HAF carbon black | 50 | 50 |
| Naphthenic type oil [1] | 7.5 | 7.5 |
| 2,2′-dithiobis(N-phenylamaleimide) [2] | 3.8 |  |
| N,N′-m-phenylene bismaleimide |  | 2.0 |

[1] Circosol 2xH—a mixture of comparatively high molecular weight hydrocarbons, sp. gr., 0.9465 aniline point, 175° F. (Sun Oil Co.).
[2] Added to the mix in the form of a paste [equal weights of 2,2′-dithiobis-(N-phenylmaleimide) and 160-180 oil].

The following table shows the results of tests on the cured samples.

| Physical Properties | Time of Cure (minutes) | Temp. of Cure (° F.) | 1 | 2 |
|---|---|---|---|---|
| Tensile Strength (p.s.i.) | 120 | 300 | 1,200 | 675 |
|  | 30 | 350 | 1,800 | 975 |
|  | 10 | 400 | 1,800 | 1,585 |
|  | 5 | 450 | 1,750 | 2,000 |
| Elongation at Break (percent) | 120 | 300 | 430 | 510 |
|  | 30 | 350 | 315 | 460 |
|  | 10 | 400 | 220 | 450 |
|  | 5 | 450 | 175 | 430 |
| Modulus at 300% (p.s.i.) | 120 | 300 | 675 | 400 |
|  | 30 | 350 | 1,675 | 575 |
|  | 10 | 400 | [1] 2,900 | 875 |
|  | 5 | 450 | [1] 3,525 | 1,200 |

[1] Extrapolated value.

EXAMPLE III

This example demonstrates that it is possible to accelerate the cure of a highly unsaturated rubber by the use of the subject compounds in conjunctions with an accelerating agent such as 2,2′-dibenzothiazyl disulfide or dicumyl peroxide. The same base recipe was used and compounding was carried out in the same maner as described in Example II. Curing was done in a press at the respective times and temperatures shown below:

| Stock | 3 | 4 | 5 | 6 |
|---|---|---|---|---|
| SBR-1500 | 100 | 100 | 100 | 100 |
| HAF carbon black | 50 | 50 | 50 | 50 |
| Naphthenic type oil | 7.5 | 7.5 | 7.5 | 7.5 |
| 2,2′-dithiobis(N-phenylmaleimide) | 1.8 | 1.8 |  |  |
| N,N′-m-phenylene bismaleimide [1] |  |  | 1.8 | 1.8 |
| 2,2′-dibenzothiazyl disulfide | 1.0 |  | 1.0 |  |
| Dicumyl peroxide |  | 0.7 |  | 0.7 |

[1] Added to the mix in the form of a paste (55 pts. of N,N′-m-phenylene bismaleimide and 45 pts. of 160-180 oil).

The following table shows the results of tests on the cured samples. The cut-growth is measured essentially as described by E. E. Auer et al., Rubber Chem. & Tech. 31, 185 (1958), "Factors Affecting Laboratory Cut-Growth Resistance of Cold SBR Tread Stocks." The units are kilocycles per inch growth.

| Physical Properties | Time of Cure (minutes) | Temp. of Cure (° F.) | 3 | 4 | 5 | 6 |
|---|---|---|---|---|---|---|
| Unaged: |  |  |  |  |  |  |
| Tensile Strength (p.s.i.) | 90 | 300 | 2,305 | 2,365 | 2,555 | 2,455 |
|  | 15 | 350 | 2,340 | 2,285 | 2,485 | 2,585 |
|  | 3 | 400 | 2,005 | 2,095 | 2,425 | 2,090 |
| Elongation at Break (percent) | 90 | 300 | 480 | 400 | 500 | 480 |
|  | 15 | 350 | 460 | 410 | 490 | 470 |
|  | 3 | 400 | 370 | 400 | 480 | 460 |
| Modulus at 200% (p.s.i.) | 90 | 300 | 500 | 625 | 535 | 640 |
|  | 15 | 350 | 480 | 550 | 545 | 615 |
|  | 3 | 400 | 455 | 490 | 560 | 575 |
| Modulus at 300% (p.s.i.) | 90 | 300 | 1,050 | 1,300 | 1,100 | 1,250 |
|  | 15 | 350 | 1,025 | 1,240 | 1,130 | 1,240 |
|  | 3 | 400 | 985 | 1,050 | 1,175 | 1,200 |
| Cut-growth at 150° F. (kc./inch growth) | 90 | 300 | 46.5 | 25.8 | 17.1 | 8.7 |
|  | 15 | 350 | 50.6 | 37.8 | 17.0 | 6.1 |
|  | 3 | 400 | 40.5 | 28.3 | 15.4 | 9.4 |
| Aged—2 days in air at 212° F.: |  |  |  |  |  |  |
| Tensile Strength (p.s.i.) | 90 | 300 | 2,380 | 2,400 | 2,720 | 2,640 |
|  | 15 | 350 | 2,210 | 2,400 | 2,610 | 2,430 |
|  | 3 | 400 | 2,060 | 2,120 | 2,500 | 2,190 |
| Elongation at Break (percent) | 90 | 300 | 420 | 360 | 450 | 430 |
|  | 15 | 350 | 390 | 370 | 410 | 410 |
|  | 3 | 400 | 370 | 350 | 410 | 390 |
| Modulus at 200% (p.s.i.) | 90 | 300 | 660 | 800 | 725 | 775 |
|  | 15 | 350 | 725 | 790 | 735 | 800 |
|  | 3 | 400 | 750 | 775 | 785 | 780 |
| Modulus at 300% (p.s.i.) | 90 | 300 | 1,375 | 1,750 | 1,400 | 1,475 |
|  | 15 | 350 | 1,475 | 1,640 | 1,450 | 1,525 |
|  | 3 | 400 | 1,500 | 1,610 | 1,550 | 1,500 |
| Cut-growth at 150° F. (kc./inch growth) | 90 | 300 | 25.1 | 16.4 | 7.8 | 5.5 |
|  | 15 | 350 | 25.0 | 22.2 | 8.9 | 5.2 |
|  | 3 | 400 | 16.0 | 14.2 | 5.4 | 6.5 |

| Physical Properties | Time of Cure (minutes) | Temp. of Cure (° F.) | 3 | 4 | 5 | 6 |
|---|---|---|---|---|---|---|
| Aged—6 days in air at 212° F.: | | | | | | |
| Tensile strength (p.s.i.) | 90 | 300 | 2,220 | 2,190 | 2,320 | 2,630 |
| | 15 | 350 | 2,290 | 2,090 | 2,660 | 2,520 |
| | 3 | 400 | 1,950 | 1,930 | 2,490 | 2,460 |
| Elongation at Break (percent) | 90 | 300 | 330 | 310 | 350 | 420 |
| | 15 | 350 | 340 | 280 | 360 | 390 |
| | 3 | 400 | 300 | 300 | 350 | 370 |
| Modulus at 200% (p.s.i.) | 90 | 300 | 925 | 1,000 | 890 | 875 |
| | 15 | 350 | 960 | 975 | 925 | 885 |
| | 3 | 400 | 975 | 950 | 950 | 900 |
| Modulus at 300% (p.s.i.) | 90 | 300 | 1,825 | [1] 1,975 | 1,700 | 1,625 |
| | 15 | 350 | 1,890 | [1] 1,900 | 1,775 | 1,650 |
| | 3 | 400 | 1,950 | [1] 1,875 | 1,825 | 1,775 |
| Cut-growth at 150° F. (kc./inch growth). | 90 | 300 | 16.6 | 9.3 | 6.1 | 8.9 |
| | 15 | 350 | 18.1 | 11.5 | 6.2 | 8.6 |
| | 3 | 400 | 21.8 | 8.8 | 3.8 | 5.5 |

[1] Extrapolated value.

The above examples, by comparison with Example II, show the spectacular acceleration of the dithio-imide cure by means of an accelerator such as 2,2'-dibenzothiazyl disulfide or dicumyl peroxide. Data also show that rubber stocks cured with the chemical of our invention not only age in air equally as well as bismaleimide cured rubber stocks, but the cured stocks have vastly improved cut-growth properties.

EXAMPLE IV

This example is similar to Example III and demonstrates that rubber stocks cured with the chemicals of this invention, in presence of either a peroxide or a thiazoletype accelerator, are better with respect to abrasion resistance than corresponding stocks which are accelerated and cured with N,N'-m-phenylene bismaleimide. Compounding and processing were carried out in the same manner as in Example II.

| | Parts by Weight | | | |
|---|---|---|---|---|
| Stock | 5 | 6 | 7 | 8 |
| SBR-1500 | 100 | 100 | 100 | 100 |
| HAF Carbon black | 50 | 50 | 50 | 50 |
| Naphthenic type oil | 7.5 | 7.5 | 7.5 | 7.5 |
| 2,2'-dithiobis(N-phenylmaleimide) | 1.7 | 1.7 | | |
| N,N'-m-phenylene bismaleimide [1] | | | 1.7 | 1.7 |
| 2,2'-dibenzothiazyl disulfide | 1.5 | | 1.5 | |
| Dicumyl peroxide | | 0.7 | | 0.7 |

[1] Added to the mix in the form of a paste (50 parts of N,N'-m-phenylen bismaleimide and 50 parts of 160-180 oil).

The following table shows the results of tests on the cured samples. The "Relative Abrasion Resistance" value is a relative rating obtained by comparing the weight loss of a standard compound (rated 100) with the weight loss of the test compound.

| Physical Properties | Time (mins.) of Cure at 320° F. | 5 | 6 | 7 | 8 |
|---|---|---|---|---|---|
| Tensile Strength (p.s.i.) | 22 | 2,115 | 2,055 | 2,405 | 2,085 |
| | 45 | 1,990 | 2,165 | 2,505 | 2,265 |
| | 90 | 1,670 | 2,310 | 2,560 | 2,390 |
| Elongation at Break (percent). | 22 | 460 | 440 | 460 | 500 |
| | 45 | 370 | 410 | 460 | 480 |
| | 90 | 350 | 410 | 450 | 470 |
| Modulus at 200% (p.s.i.) | 22 | 525 | 525 | 550 | 510 |
| | 45 | 675 | 610 | 620 | 530 |
| | 90 | 775 | 750 | 665 | 590 |
| Relative Abrasion Resistance. | 22 | 71.4 | 70.5 | 68.7 | 59.8 |
| | 45 | 79.6 | 80.0 | 73.6 | 65.7 |
| | 90 | 89.0 | 84.2 | 74.7 | 66.4 |

EXAMPLE V

This example demonstrates that 4,4'-dithiobis(N-phenylmaleimide) is equally as effective as 2,2'-dithiobis(N-phenylmaleimide) as a vulcanizing agent for rubber. Further, the example shows that it is possible to accelerate the 4,4'-dithiobis(N-phenylmaleimide) cure of SBR by the use of either 2,2'-dibenzothiazyl disulfide or dicumyl peroxide as the accelerating agent. Compounding and processing were carried out in the same manner as in Example II.

| | Parts by Weight | | | | |
|---|---|---|---|---|---|
| Stock | 9 | 10 | 11 | 12 | 13 |
| SBR-1500 | 100 | 100 | 100 | 100 | 100 |
| HAF carbon black | 50 | 50 | 50 | 50 | 50 |
| Naphthenic type oil | 7.5 | 7.5 | 7.5 | 7.5 | 7.5 |
| 4,4'-dithiobis(N-phenylmaleimide) | 2.0 | 2.0 | 2.0 | | |
| N,N'-m-phenylene bismaleimide | | | | 1.0 | 1.0 |
| 2,2'-dibenzothiazyl disulfide | | 1.5 | | 1.5 | |
| Dicumyl peroxide | | | 0.7 | | 0.7 |

The following table shows the results of tests on the cured samples.

| Physical Properties | Time (mins.) of Cure at 320° F. | 9 | 10 | 11 | 12 | 13 |
|---|---|---|---|---|---|---|
| Tensile Strength (p.s.i.) | 22 | 675 | 1,275 | 1,785 | 1,925 | 1,835 |
| | 45 | 1,350 | 1,275 | 2,010 | 2,050 | 1,950 |
| Elongation at Break (percent) | 22 | 645 | 235 | 410 | 340 | 330 |
| | 45 | 945 | 220 | 390 | 335 | 315 |
| Modulus at 300% (p.s.i.) | 22 | 300 | [1] 1,825 | 1,125 | 1,625 | 1,535 |
| | 45 | 575 | [1] 2,050 | 1,375 | 1,725 | 1,775 |

[1] Extrapolated value.

Having thus described my invention, what I claim and desire to protect by Letters Patent is:

1. Symmetrical dithiobis(N-phenylmaleimide) having the formula:

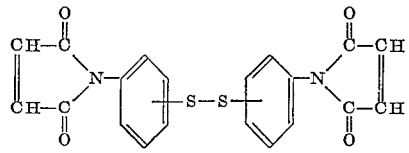

2. 2,2'-dithiobis(N-phenylmaleimide).
3. 4,4'-dithiobis(N-phenylmaleimide).

References Cited by the Examiner

UNITED STATES PATENTS

| 2,554,182 | 5/1951 | Funz | 260—79.5 |
| 2,586,769 | 2/1952 | Himel et al. | 260—79.5 |
| 3,018,290 | 1/1962 | Sauers et al. | 260—326.3 |
| 3,071,592 | 1/1963 | Ladd | 260—326.3 |

ALEX MAZEL, Primary Examiner.

WILLIAM H. SHORT, Examiner.

M. P. HENDRICKSON, J. TOVAR, Assistant Examiners.